(12) United States Patent
Mousa et al.

(10) Patent No.: US 10,496,783 B2
(45) Date of Patent: Dec. 3, 2019

(54) CONTEXT-AWARE PATTERN MATCHING FOR LAYOUT PROCESSING

(71) Applicant: Mentor Graphics Corporation, Wilsonville, OR (US)

(72) Inventors: Sherif Hany Riad Mohammed Mousa, Beaverton, OR (US); Jonathan James Muirhead, Portland, OR (US); Alex Joseph Pearson, Wilsonville, OR (US); William Matthew Hogan, Wilsonville, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 81 days.

(21) Appl. No.: 15/873,833

(22) Filed: Jan. 17, 2018

(65) Prior Publication Data

US 2018/0307791 A1 Oct. 25, 2018

Related U.S. Application Data

(60) Provisional application No. 62/487,102, filed on Apr. 19, 2017.

(51) Int. Cl.
*G06F 17/50* (2006.01)
*G06K 9/62* (2006.01)

(52) U.S. Cl.
CPC ....... *G06F 17/5081* (2013.01); *G06K 9/6203* (2013.01); *G06K 9/6212* (2013.01); *G06F 2217/12* (2013.01)

(58) Field of Classification Search
CPC ........... G06F 17/5081; G06F 2217/12; G06K 9/6203; G06K 9/6212
See application file for complete search history.

(56) References Cited

U.S. PATENT DOCUMENTS

| | | | | | |
|---|---|---|---|---|---|
| 7,155,689 | B2 * | 12/2006 | Pierrat | ............... | G06F 17/5036 716/52 |
| 7,249,342 | B2 * | 7/2007 | Pack | ......................... | G03F 1/36 430/5 |
| 7,302,672 | B2 * | 11/2007 | Pack | ......................... | G03F 1/36 430/5 |
| 7,523,429 | B2 * | 4/2009 | Kroyan | ............... | G06F 17/5068 716/119 |
| 7,984,396 | B2 * | 7/2011 | Kimoto | ............... | G06F 17/5068 430/5 |
| 8,510,689 | B1 * | 8/2013 | White | ................ | G06F 17/5068 716/101 |

(Continued)

OTHER PUBLICATIONS

J Muirhead et al., "Analog Design and Pattern Matching: A Perfect Pairing", www.mentor.com,, Jul. 2015.

*Primary Examiner* — Naum Levin

(57) ABSTRACT

Aspects of the disclosed technology relate to techniques of context-aware pattern matching and processing. A circuit design is analyzed to identity circuit components of interest. Reference layout patterns that are associated with the circuit components of interest are extracted from a layout design based on the association of circuit components of the circuit design with geometric elements of the layout design. Pattern matching is performed to identify layout patterns that match the reference layout patterns. The identified layout patterns are then processed.

18 Claims, 7 Drawing Sheets

Flow chart 400

(56) References Cited

U.S. PATENT DOCUMENTS

| | | | |
|---|---|---|---|
| 8,539,416 B1* | 9/2013 | Rossman | G06F 17/5081 |
| | | | 716/118 |
| 8,694,928 B2* | 4/2014 | Cao | G03F 1/14 |
| | | | 716/54 |
| 8,914,760 B2* | 12/2014 | Salem | G06F 17/5081 |
| | | | 703/14 |
| 8,924,896 B2* | 12/2014 | Wang | G06F 17/5081 |
| | | | 716/54 |
| 8,959,472 B1* | 2/2015 | Frederick, Jr. | G06F 17/5077 |
| | | | 716/122 |
| 9,046,573 B1* | 6/2015 | Watt | G06F 17/5045 |
| 9,335,624 B2* | 5/2016 | Lee | G03F 1/00 |
| 9,659,138 B1* | 5/2017 | Powell | G06F 17/5081 |
| 9,946,827 B2* | 4/2018 | Wang | G06F 17/5068 |
| 2005/0233228 A1* | 10/2005 | Fijol | G03F 7/70283 |
| | | | 430/50 |
| 2007/0256046 A1* | 11/2007 | Pikus | G06F 17/5068 |
| | | | 716/54 |
| 2014/0215415 A1* | 7/2014 | Wang | G06F 17/5081 |
| | | | 716/52 |
| 2015/0121317 A1* | 4/2015 | Lee | G03F 1/00 |
| | | | 716/52 |

* cited by examiner

CONTEXT-AWARE PATTERN MATCHING FOR LAYOUT PROCESSING

RELATED APPLICATIONS

This application claims the benefit of U.S. Provisional Patent Application No. 62/487,102, filed on Apr. 19, 2017, and naming Sherif Hany Riad Mohammed Mousa et al. as inventors, which application is incorporated entirely herein by reference.

FIELD OF THE DISCLOSED TECHNOLOGY

The present disclosed technology relates to the field of circuit design verification. Various implementations of the disclosed technology may be particularly useful for full-chip simulation of current density.

BACKGROUND OF THE DISCLOSED TECHNOLOGY

Design patterns have a wide variety of applications in the design, verification and test flows of integrated circuits (ICs). A design pattern comprises one or more polygons confined within a fixed 2-D space on one or more layers of a layout design; a polygon is formed by a set of edges; and an edge has two vertexes. Design patterns can be defined based on size and/or location specifications of these layout elements.

The simplicity of capturing complex geometric relationships with design patterns enables advanced physical verification and design methodology checks that were previously difficult or operationally impossible to create. The most common use of design patterns today is the visual identification of problematic topological configurations during manufacturing process simulations, failure analysis, and other verification/validation techniques. Simulations and layout analysis techniques can detect design features or configurations that will likely fail or negatively impact yield during manufacturing due to a variety of defects. Failure analysis can use post-manufacture silicon testing and yield analysis techniques to identify and isolate systematic defects that appear repetitively across dies and designs. These problematic configurations can be used to identify and isolate specific geometric configurations (patterns) directly from a layout design through pattern matching.

Before matching a pattern in a layout design, the pattern to be used in the search process (referred to as reference pattern) needs to be defined or captured. Pattern capture can be achieved directly using text descriptions. For some verification processes, complex geometries in a layout design are defined by selecting a desired configuration from a visual representation. Once recognized and defined, reference patterns can be added to a pattern library for use across multiple designs and dies, and many reference patterns can be carried forward from one node to the next with suitable adjustment.

A conventional reference pattern capture process often involved visual inspection and measurement by a designer familiar with the common failure mechanisms. The complexities of today's integrated circuits have made this task sufficiently complex that it can no-longer be reliably or confidently done by hand. The density of circuits and new technology requirements, like multi-patterning and FinFETs (3D gates), have resulted in the need for maintaining desired electrical performance characteristics during layout preparation and mask generation. Sensitive nets within the design may also require that they are "guarded" from other nets with aggressive switching and other electrical characteristics. During the lifetime operation of these circuits, performance degradation is often observed. While this degradation in isolation may be undesirable, uniform degradation of an entire functional block may be acceptable. In these cases, device orientation and symmetrical implementation often plays an important role to ensure symmetry in this degradation of the overall circuit. It is thus desirable to develop new pattern matching techniques that can identify electrically sensitive circuit elements in layout designs with minimum human effort and can process these identified elements to achieve the desired electrical characteristics.

BRIEF SUMMARY OF THE DISCLOSED TECHNOLOGY

Aspects of the disclosed technology relate to techniques of context-aware pattern matching and processing. In one aspect, there is a method comprising: receiving a circuit design, circuit components of the circuit design being associated with geometric elements of a layout design; analyzing the circuit design to identity circuit components of interest; extracting reference layout patterns that are associated with the circuit components of interest; performing pattern matching to identify layout patterns that match the reference layout patterns; processing the layout patterns; and reporting results of the processing.

The extracting may comprise: determining preliminary reference layout patterns that are associated with the circuit components of interest; and compressing the preliminary reference layout patterns to generate reference layout patterns. The pattern matching may comprise fuzzy pattern matching The processing may comprises adding dummy fills to the layout patterns. The dummy fills may be added based on orientations of the layout patterns. Alternatively or additionally, the processing may comprise performing layout decomposition for multiple-patterning.

In another aspect, there is one or more computer-readable media storing computer-executable instructions for causing one or more processors to perform the above method.

In still another aspect, there is a system, comprising: one or more processors, the one or more processors programmed to perform the above method.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed technology. Thus, for example, those skilled in the art will recognize that the disclosed technology may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNOLOGY

General Considerations

Figure 1:
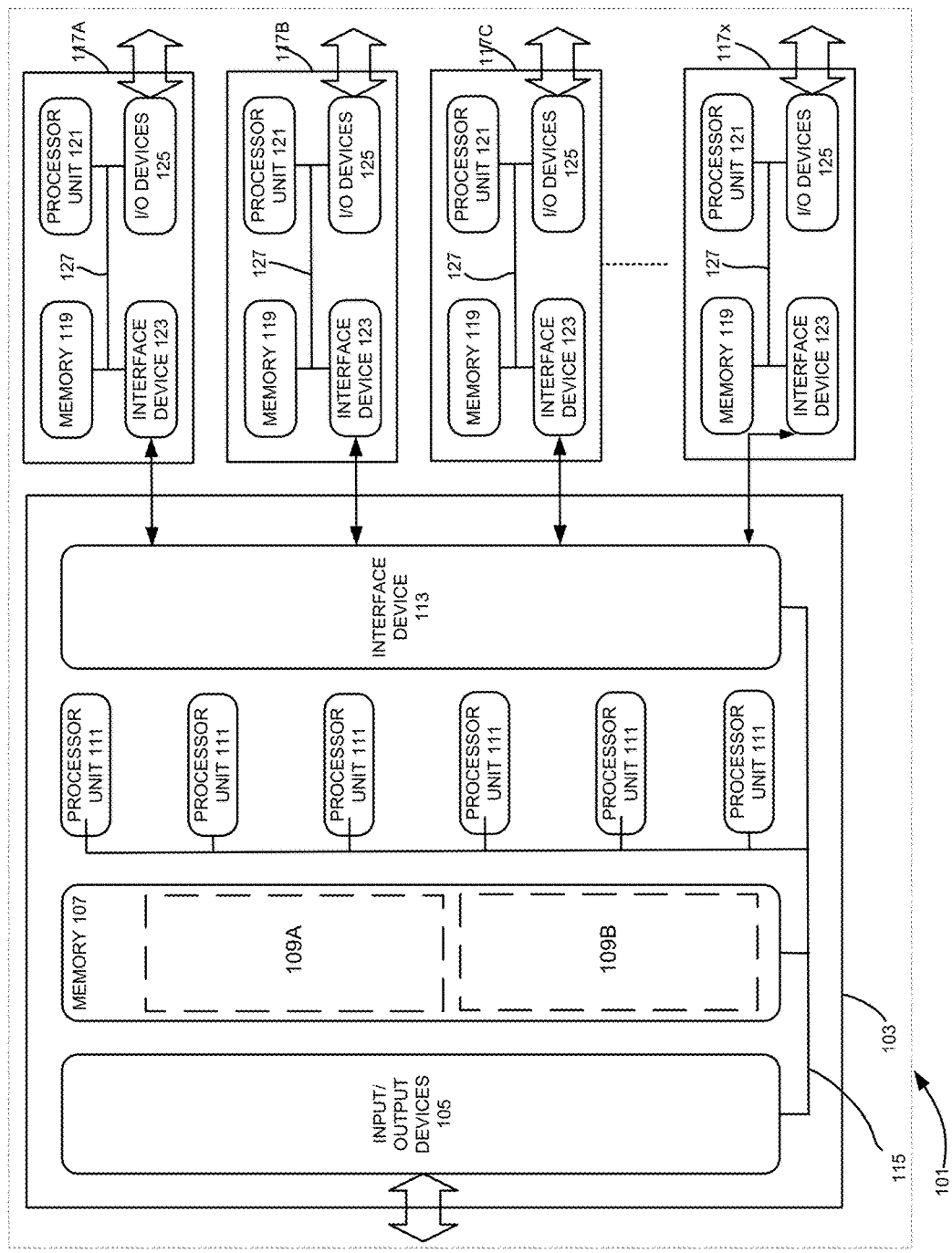
FIG. 1 illustrates an example of a computing system that may be used to implement various embodiments of the disclosed technology.

Various aspects of the present disclosed technology relate to techniques of context-aware pattern matching and processing. In the following description, numerous details are set forth for the purpose of explanation. However, one of ordinary skill in the art will realize that the disclosed technology may be practiced without the use of these specific details. In other instances, well-known features have not been described in detail to avoid obscuring the present disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods. Additionally, the detailed description sometimes uses terms like "perform", "extract," "process" and "analyze" to describe the disclosed methods. Such terms are high-level abstractions of the actual operations that are performed. The actual operations that correspond to these terms will vary depending on the particular implementation and are readily discernible by one of ordinary skill in the art.

Also, as used herein, the term "design" is intended to encompass data describing an entire integrated circuit device. This term also is intended to encompass a smaller group of data describing one or more components of an entire device, however, such as a portion of an integrated circuit device. Still further, the term "design" also is intended to encompass data describing more than one micro device, such as data to be used to form multiple micro devices on a single wafer.

Illustrative Operating Environment

The execution of various electronic design automation processes according to embodiments of the disclosed technology may be implemented using computer-executable software instructions executed by one or more programmable computing devices. Because these embodiments of the disclosed technology may be implemented using software instructions, the components and operation of a generic programmable computer system on which various embodiments of the disclosed technology may be employed will first be described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 1. This operating environment is only one example of a suitable operating environment, however, and is not intended to suggest any limitation as to the scope of use or functionality of the disclosed technology.

In FIG. 1, the computer network 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information.

As will be discussed in detail below, the master computer 103 runs a software application for performing one or more operations according to various examples of the disclosed technology. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire® microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
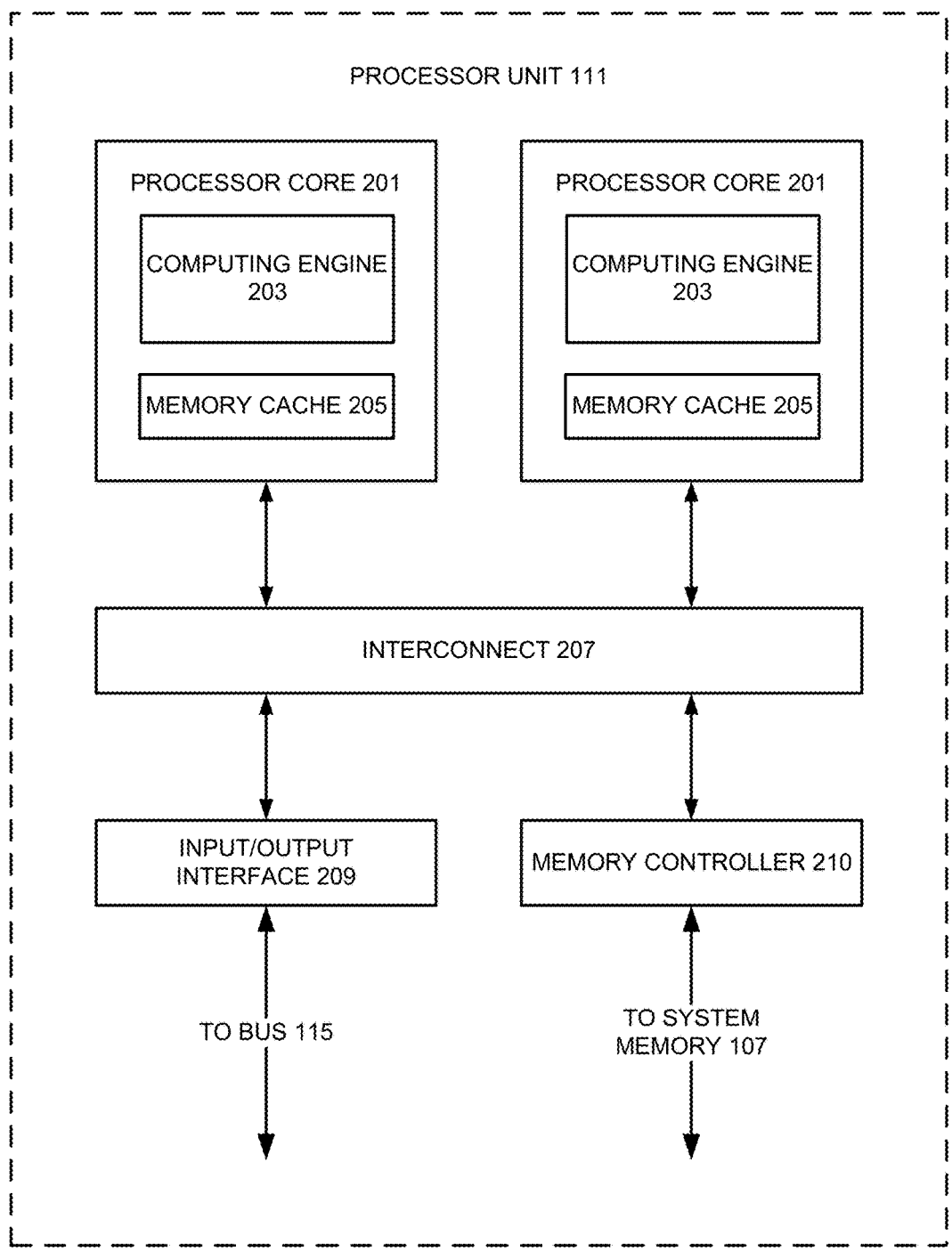
FIG. 2 illustrates an example of a multi-core processor unit that may be used to implement various embodiments of the disclosed technology.

With some implementations of the disclosed technology, the master computing device 103 may employ one or more processing units 111 having more than one processor core. Accordingly, FIG. 2 illustrates an example of a multi-core processor unit 111 that may be employed with various embodiments of the disclosed technology. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 111. With some processor cores 201, such as the Cell microprocessor created by Sony Corporation, Toshiba Corporation and IBM Corporation, the interconnect 207 may be implemented as an interconnect bus. With other processor units 111, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interface 209 and a memory controller 210. The input/output interface 209 provides a communication interface between the processor unit 111 and the bus 115. Similarly, the memory controller 210 controls the exchange of information between the processor unit 111 and the system memory 107. With some implementations of the disclosed technology, the processor units 111 may include additional components, such as a high-level cache memory accessible shared by the processor cores 201.

While FIG. 2 shows one illustration of a processor unit 111 that may be employed by some embodiments of the disclosed technology, it should be appreciated that this illustration is representative only, and is not intended to be limiting. Also, with some implementations, a multi-core processor unit 111 can be used in lieu of multiple, separate processor units 111. For example, rather than employing six separate processor units 111, an alternate implementation of the disclosed technology may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the servant computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the servant computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each servant computer 117 may include a memory 119, a processor unit 121, an interface device 123, and, optionally, one more input/output devices 125 connected together by a system bus 127. As with the master computer 103, the optional input/output devices 125 for the servant computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel® Pentium® or Xeon™ microprocessors, Advanced Micro Devices Athlon™ microprocessors or Motorola 68K/Coldfire® microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. For example, with some implementations of the disclosed technology, one or more of the processor units 121 may be a Cell processor. The memory 119 then may be implemented using any combination of the computer readable media discussed above. Like the interface device 113, the interface devices 123 allow the servant computers 117 to communicate with the master computer 103 over the communication interface.

In the illustrated example, the master computer 103 is a multi-processor unit computer with multiple processor units 111, while each servant computer 117 has a single processor unit 121. It should be noted, however, that alternate implementations of the disclosed technology may employ a master computer having single processor unit 111. Further, one or more of the servant computers 117 may have multiple processor units 121, depending upon their intended use, as previously discussed. Also, while only a single interface device 113 or 123 is illustrated for both the master computer 103 and the servant computers, it should be noted that, with alternate embodiments of the disclosed technology, either the computer 103, one or more of the servant computers 117, or some combination of both may use two or more different interface devices 113 or 123 for communicating over multiple communication interfaces.

With various examples of the disclosed technology, the master computer 103 may be connected to one or more external data storage devices. These external data storage devices may be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the disclosed technology, one or more of the servant computers 117 may alternately or additionally be connected to one or more external data storage devices. Typically, these external data storage devices will include data storage devices that also are connected to the master computer 103, but they also may be different from any data storage devices accessible by the master computer 103.

It also should be appreciated that the description of the computer network illustrated in FIG. 1 and FIG. 2 is provided as an example only, and it not intended to suggest any limitation as to the scope of use or functionality of alternate embodiments of the disclosed technology.

Design Flow, Dummy Fill, and Multiple Patterning

Electronic circuits, such as integrated microcircuits, are used in a variety of products, from automobiles to microwaves to personal computers. Designing and fabricating integrated circuit devices typically involves many steps, sometimes referred to as a "design flow." The particular steps of a design flow often are dependent upon the type of integrated circuit, its complexity, the design team, and the integrated circuit fabricator or foundry that will manufacture the microcircuit. Typically, software and hardware "tools" verify the design at various stages of the design flow by running software simulators and/or hardware emulators. These steps aid in the discovery of errors in the design, and allow the designers and engineers to correct or otherwise improve the design.

Several steps are common to most design flows. Initially, the specification for a new circuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a Hardware Design Language (HDL), such as the Very high speed integrated circuit Hardware Design Language (VHDL). The logic of the circuit is then analyzed, to confirm that it will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This device design generally corresponds to the level of representation displayed in conventional circuit diagrams. The relationships between the electronic devices are then analyzed, to confirm that the circuit described by the device design will correctly perform the desired functions. This analysis is sometimes referred to as "formal verification." Additionally, preliminary timing estimates for portions of the circuit are often made at this stage, using an assumed characteristic speed for each device, and incorporated into the verification process.

Once the components and their interconnections are established, the design is again transformed, this time into a physical design that describes specific geometric elements. This type of design often is referred to as a "layout" design. The geometric elements, which typically are polygons, define the shapes that will be created in various layers of material to manufacture the circuit. Typically, automated place and route tools will be used to define the physical layouts, especially of wires that will be used to interconnect the circuit devices. Each layer of the microcircuit will have a corresponding layer representation in the layout design, and the geometric shapes described in a layer representation will define the relative locations of the circuit elements that will make up the circuit device. For example, shapes in the layer representation of a metal layer will define the locations of the metal wires used to connect the circuit devices. Custom layout editors, such as Mentor Graphics' IC Station or Cadence's Virtuoso, allow a designer to custom design the layout, which is mainly used for analog, mixed-signal, RF, and standard-cell designs.

Integrated circuit layout descriptions can be provided in many different formats. The Graphic Data System II (GDSII) format is a popular format for transferring and archiving two-dimensional graphical IC layout data. Among other features, it contains a hierarchy of structures, each structure containing layout elements (e.g., polygons, paths or polylines, circles and textboxes). Other formats include an open source format named Open Access, Milkyway by Synopsys, Inc., EDDM by Mentor Graphics, Inc., and the more recent Open Artwork System Interchange Standard (OASIS) proposed by Semiconductor Equipment and Materials International (SEMI). These various industry formats are used to define the geometrical information in IC layout designs that are employed to manufacture integrated circuits. Once the microcircuit device design is finalized, the layout portion of the design can be used by fabrication tools to manufacture the device using a photolithographic process.

Modern integrated circuits typically will be formed of multiple layers of material, such as metal, diffusion material, and polysilicon. During the manufacturing process, layers of material are formed on top of one another sequentially. After each layer is created, portions of the layer are removed to form structures. Together, the structures of material form the functional circuit devices, such as transistors, capacitors and resistors, which will make up the integrated circuit. Before a new layer is formed over the structures in an existing layer, however, the existing layer must be polished to ensure planarity. Polishing using any of various types of polishing processes sometimes will generically be referred to as "planarization."

One problem with conventional planarization methods is that different materials will have different densities, so softer materials will be polished more than harder materials. As a result, a layer's surface may become uneven, causing the next layer to be more uneven. In some situations, the uppermost layers of material may have a very irregular surface topography. Such irregular surface topographies may cause a variety of flaws in the circuit structures, such as holes, loss of contact, and other manufacturing defects.

To improve the planarity of a layer of material, the integrated circuit designer (or manufacturer) often will analyze a circuit layout design for empty regions in the layer. That is, the designer or manufacturer will review the density of the geometric elements representing the structures that will be formed in the layer (sometimes referred to as "pattern density"), to identify regions that are empty of these geometric elements. The designer or manufacturer will then modify the circuit layout design to fill these empty regions with data representing "dummy" or "fill" geometric elements. That is, the designer or manufacturer will increase the density of the geometric elements in the circuit layout design for the layer by adding geometric elements that will form non-functional structures. When the circuit is manufactured, these "fill" structures will be formed alongside the "functional" structures (i.e., the structures used to form functional circuit devices), so that the overall surface of the layer is relatively flat. This type of corrective technique will often be implemented using a software application for identifying and manipulating structures defined in a circuit layout design, such as the CALIBRE® verification and manufacturability software tools available from Mentor Graphics® Corporation of Wilsonville, Oreg. With the continuous increase of circuit density, electrical coupling of "fill" may cause non-symmetrical device performance which is undesirable in active circuit operation. It is advantageous to identify layout patterns associated with these devices and to fill the patterns in a particular way that can achieve the desired electrical characteristics.

As the technology node advances, the traditional single exposure lithography is no longer a viable technique. At the 20 nm node, semiconductor manufacturers have adopted double patterning lithography techniques. A common form of double patterning lithography decomposes a layout design into two portions for two masks. The decomposition process is often referred to as coloring, i.e., the mask layers are assigned colors. The two masks are used in two separate exposure processes with the existing 193 nm water immersion lithography. The two coarser patterns formed are combined and superimposed, which enables a single finer image on the wafer. This form of double patterning is sometimes called pitch splitting, or more directly referred to as "LELE" (Litho-Etch-Litho-Etch).

Not all existing layout designs, however, can be readily shrunk to the 20 nm node using double patterning lithography. This is because some parts of a layout design may not be decomposed into two colored portions that can maintain the double patterning compliance—the minimum space between layout features of the same color is two times that between layout features of different colors. Particularly challenging are two-dimensional layout features such as line-ends and via features. In addition to difficulties in handling two-dimensional features, double patterning lithography may not be adequate even for one-dimensional layout features at the 10 nm node and below. At the 10 nm node, chipmakers may need to move to another pitch splitting technique—triple patterning. One form of triple patterning is litho-etch-litho-etch-litho-etch (LELELE). LELELE is similar to LELE. In the fab, LELELE requires three separate lithography and etch steps to define a single layer. One challenge faced by all pitch-splitting based multiple patterning techniques is to identify geometric elements that should be kept one the same color mask to achieve desired electrical characteristics.

Context-Aware Patent Matching Tool

Figure 3:
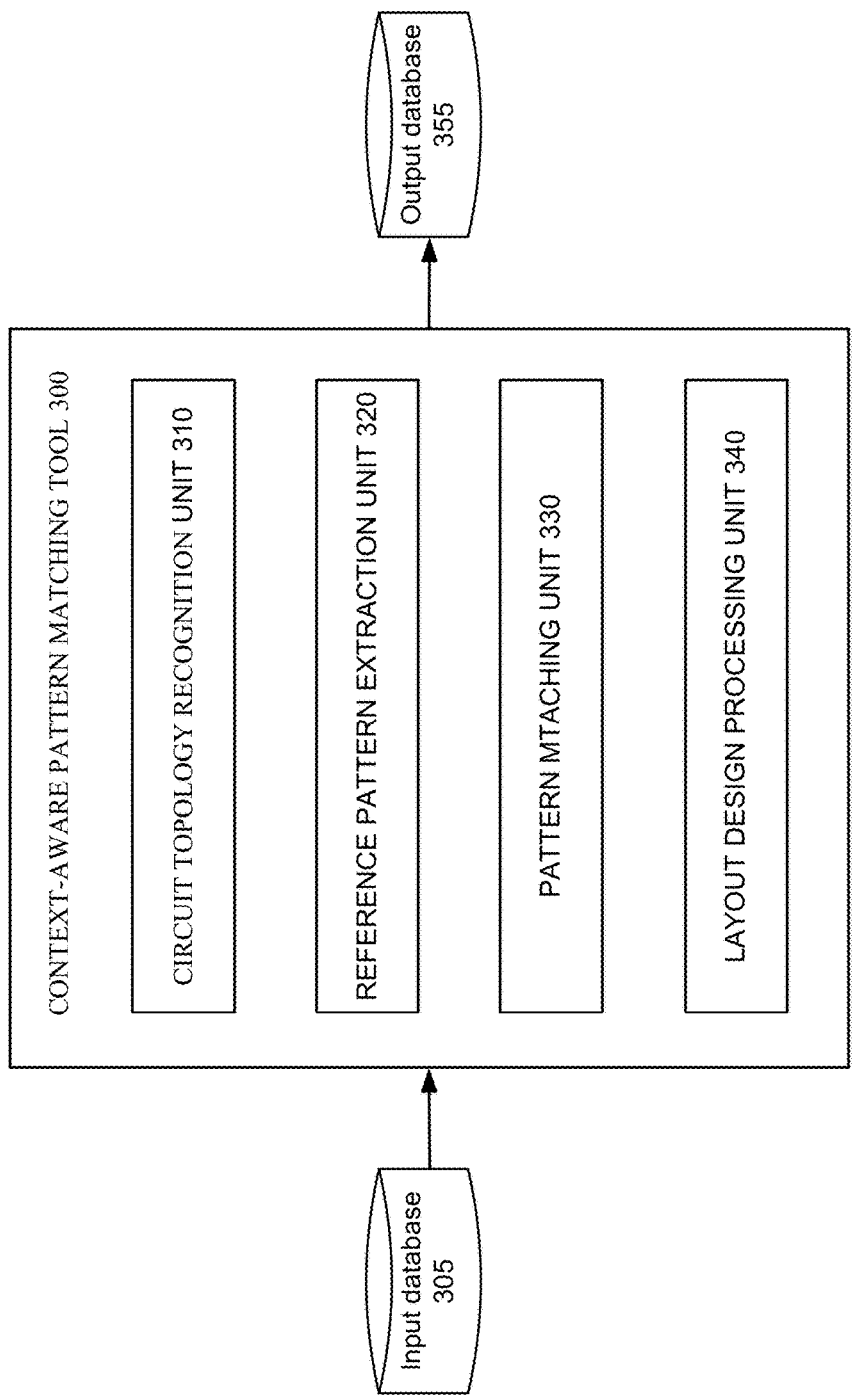
FIG. 3 illustrates an example of a context-aware patent matching tool according to various embodiments of the disclosed technology.

FIG. 3 illustrates an example of a context-aware patent matching tool 300 that may be implemented according to various embodiments of the disclosed technology. As seen in this figure, the context-aware patent matching tool 300 includes a circuit topology recognition unit 310, a reference pattern extraction unit 320, a pattern matching unit 330 and a layout design processing unit 340. Some implementations of the circuit design verification tool 300 may cooperate with (or incorporate) one or more of an input database 305 and an output database 355.

As will be discussed in more detail below, the context-aware patent matching tool 300 can receive a circuit design from the input database 305. Circuit components of the circuit design are associated with geometric elements of a layout design. The circuit topology recognition unit 310 analyzes the circuit design to identity circuit components of interest based on a user's specification. The reference pattern extraction unit 320 extracts reference layout patterns that are associated with the circuit components of interest. The pattern matching unit 330 performs pattern matching to identify layout patterns that match the reference layout patterns. The layout design processing unit 340 processes the layout patterns. The context-aware patent matching tool 300 reports results of the processing. The reporting may include storing the results of the processing in the output database 355.

As previously noted, various examples of the disclosed technology may be implemented by one or more computing systems, such as the computing system illustrated in FIGS. 1 and 2. Accordingly, one or more of the circuit topology recognition unit 310, the reference pattern extraction unit 320, the pattern matching unit 330 and the layout design processing unit 340 may be implemented by executing programming instructions on one or more processors in one or more computing systems, such as the computing system illustrated in FIGS. 1 and 2. Correspondingly, some other embodiments of the disclosed technology may be implemented by software instructions, stored on a non-transitory computer-readable medium, for instructing one or more programmable computers/computer systems to perform the functions of one or more of the circuit topology recognition unit 310, the reference pattern extraction unit 320, the pattern matching unit 330 and the layout design processing unit 340. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, or a solid state storage device.

It also should be appreciated that, while the circuit topology recognition unit 310, the reference pattern extraction unit 320, the pattern matching unit 330 and the layout design processing unit 340 are shown as separate units in FIG. 3, a single computer (or a single processor within a master computer) or a single computer system may be used to implement all of these units at different times, or components of these units at different times.

With various examples of the disclosed technology, the input database 305 and the output database 355 may be implemented using any suitable computer readable storage device. That is, either of the input database 305 and the output database 355 may be implemented using any combination of computer readable storage devices including, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable storage devices may also include magnetic cassettes, magnetic tapes, magnetic disks or other magnetic storage devices, holographic storage devices, or any other non-transitory storage medium that can be used to store desired information. While the input database 305 and the output database 355 are shown as separate units in FIG. 3, a single data storage medium may be used to implement some or all of these databases.

Context-Aware Pattern Matching and Processing

Figure 4:
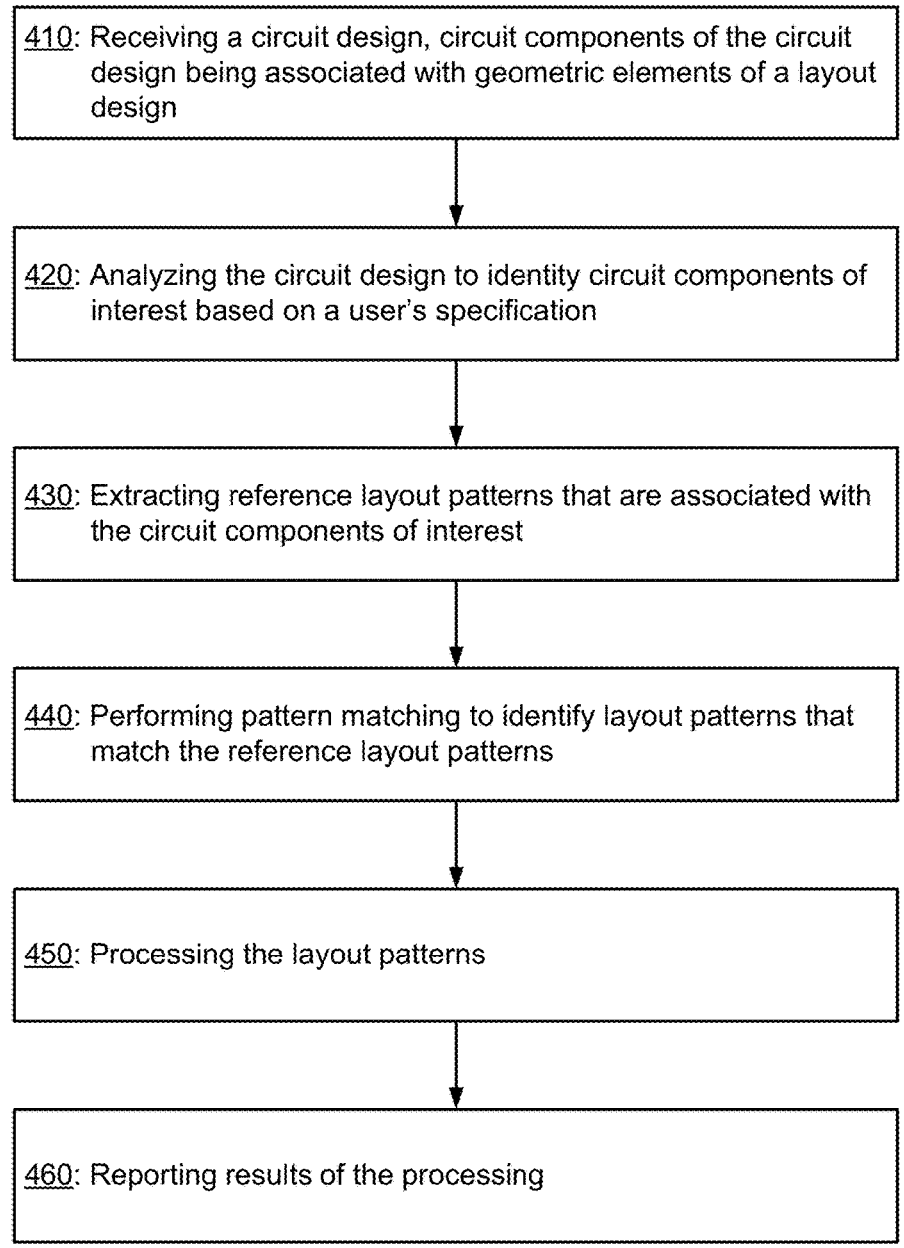
FIG. 4 illustrates a flowchart showing a process of context-aware pattern matching and processing that may be implemented according to various examples of the disclosed technology.

FIG. 4 illustrates a flowchart 400 showing a process of context-aware pattern matching and processing that may be implemented according to various examples of the disclosed technology. For ease of understanding, methods of context-aware pattern matching and processing that may be employed according to various embodiments of the disclosed technology will be described with reference to the context-aware patent matching tool 300 in FIG. 3 and the flow chart 400 illustrated in FIG. 4. It should be appreciated, however, that alternate implementations of a context-aware patent matching tool may be used to perform the methods of context-aware pattern matching and processing illustrated by the flow chart 400 according to various embodiments of the disclosed technology. Likewise, the context-aware patent matching tool 300 may be employed to perform other methods of context-aware pattern matching and processing according to various embodiments of the disclosed technology.

In operation 410, the context-aware patent matching tool 300 receives a circuit design. The circuit design comprises a logic (or analog, or mixed signal) circuit design such as a netlist and a physical layout design. The netlist may be derived from the layout design. Alternatively, the netlist may be derived from a schematic design. The netlist can be considered as a textual analog of the schematic which is applicable and normally used for computer-aided processing and circuit equations formulating. A schematic graph itself may be derived from the schematic netlist.

The circuit components of the circuit design are associated with geometric elements of the layout design. The cross-reference information between logic identifiers and layout features may be generated according to methods disclosed in U.S. patent application Ser. No. 13/017,788 (U.S. Publication Number US2011-0320990A1), which is incorporated herein by reference.

In operation 420, the circuit topology recognition unit 310 analyzes the circuit design to identity circuit components of interest based on a user's specification. The circuit components of interest can be one circuit component or a group of circuit components (sometimes referred to as a net) defined by users. For example, parasitic capacitive coupling between fill and a circuit component such as a signal wire or an inductor may cause non-symmetrical device performance. The devices sensitive to the fill pattern may be a circuit component of interest. A circuit component of interest may also be a net that needed to be "guarded" from other nets with aggressive switching and other electrical characteristics. For multi-patterning, different "colors" are used to denote how a circuit will be printed in multiple stages to make an entire circuit. As each color is printed in a different pass of the manufacturing process, there are slight variations (tolerances) associated with each pass that will impact device and circuit performance. Printing sensitive and highly matched elements such as current mirrors and differential pairs on the same color pass is highly desirable. These sensitive and highly matched elements can be the circuit components of interest.

The circuit design provides information about the structure and the components constituting the circuit. The circuit topology recognition unit 310 may identify the circuit components of interest in the circuit design by simply selecting devices based on the type and specification information provided by the user. Additionally or alternatively, the circuit topology recognition unit 310 may employ one or more circuit topology recognition techniques to search the circuit design for a predetermined topological pattern such as a SPICE pattern template that describes a device. The circuit topology recognition is sometimes referred to as topology pattern matching. Fuzzy matching algorithms, which allow variability in device parameters, may be employed to identify circuit components that are not exactly the same but are similar. The circuit topology recognition unit 310 may be implemented by various software tools such as those in the Calibre family of software tools available from Mentor Graphics Corporation, Wilsonville, Oreg.

In operation 430, the reference pattern extraction unit 320 extracts reference layout patterns that are associated with the circuit components of interest. As noted previously, the circuit components and the layout elements are cross-referenced. Accordingly, layout regions that are associated with the circuit components of interest can be readily determined. The reference layout patterns may be extracted from these layout regions based on predetermined criteria or specifications. It should be noted that a reference layout pattern can contain more than just a few geometric elements on a single layer. In some embodiments of the disclosed technology, the derived layout patterns are compressed. For example, duplicated patterns are removed. Additionally, the description of a reference layout pattern may include variability. As such, similar layout patterns can be represented by one reference layout pattern. The extracted reference layout patterns may be stored in a reference pattern library for pattern matching.

In operation 440, the pattern matching unit 330 performs pattern matching to identify layout patterns that match the reference layout patterns. Various algorithms can be used to perform pattern comparison and recognition techniques. The pattern matching unit 330 may be implemented by various pattern matching tools such as those in the Calibre family of software tools available from Mentor Graphics Corporation, Wilsonville, Oreg. A Calibre pattern matching tool typically scans the layout design, and places a marker at the site of every pattern match.

Figure 5:
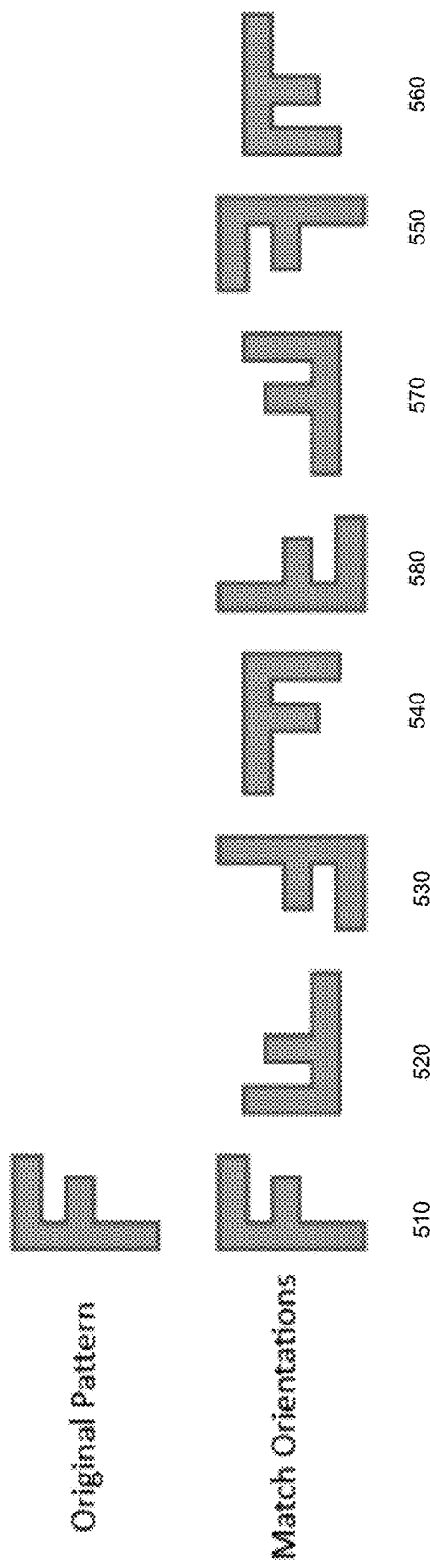
FIG. 5 illustrates eight possible orientations of a geometric element in a layout design following the Manhattan layout style.

Each of the reference layout patterns may exist in a layout design in multiple orientations. There are total eight possible orientations for the Manhattan layout style as illustrated in FIG. 5: 0 degree rotation (510), 90 degree rotation (520), 180 degree rotation (530), 270 degree rotation (540) and their image counterparts (550-580). The pattern matching unit 330 can search for patterns in the layout design that matches it in each of the orientations. The pattern matching unit 330 may also perform fuzzy pattern matching. Similar layout patterns with allow-able variations in length, width and/or spacing can be identified. A reference layout pattern with variable specifications may be used for this purpose.

In operation 450, the layout design processing unit 340 processes the layout patterns identified by the pattern matching unit 330. The disclosed technology can be employed by various aspects of the design, verification and manufacturing process. One example is dummy fill. Conventional fill flows scan an entire layout area without considering the orientation of the shapes in the layout. However, shifts in the fill can impact both the electrical performance of a design, as well as its manufacturability. The disclosed technology lets designers capture unique configurations that represent sensitive devices as patterns, fill those patterns in the most efficient and effective way, and automatically applies the filled pattern where the original pattern is found in the design, ensuring consistency throughout the layout design.

Figure 6:
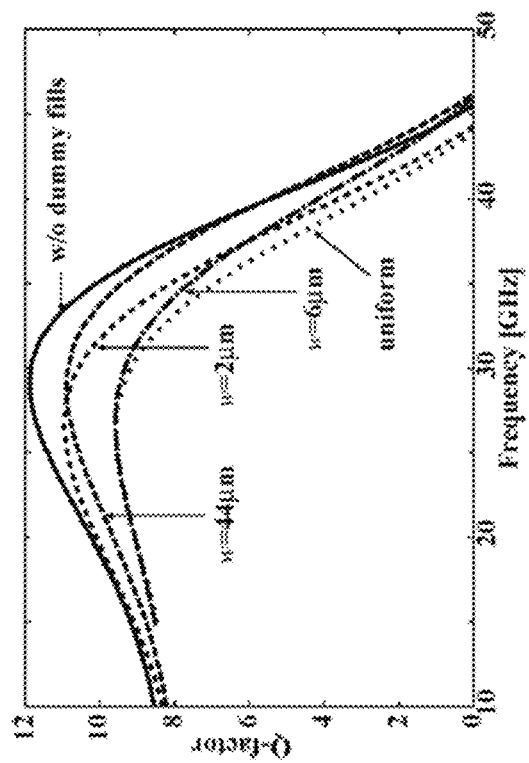
FIG. 6 illustrates an example of interactions between the size of dummy fills and the quality factor (Q-factor) of a spiral inductor.
Figure 6:
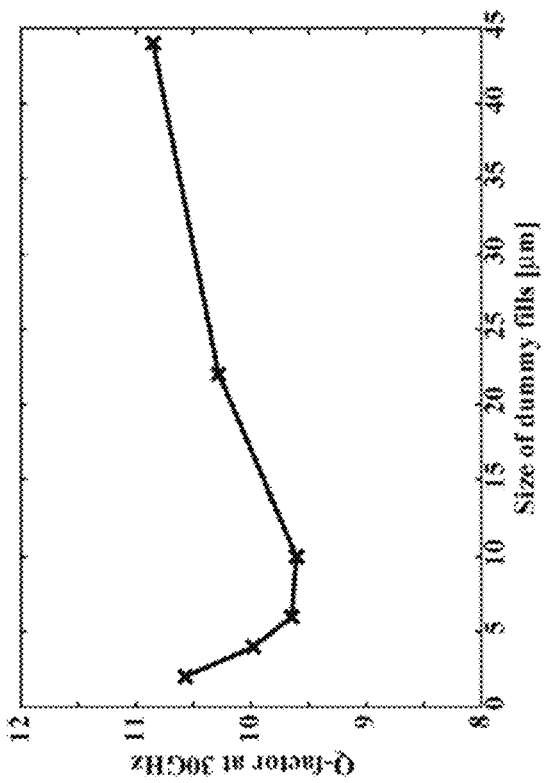
Figure 7B:
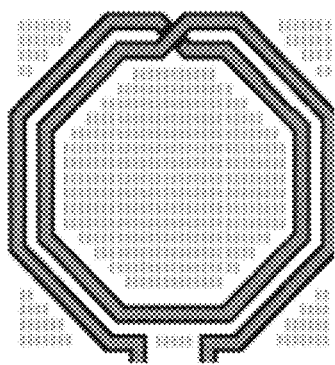
FIG. 7B illustrates an example of the spiral inductor being filled.
Figure 7D:
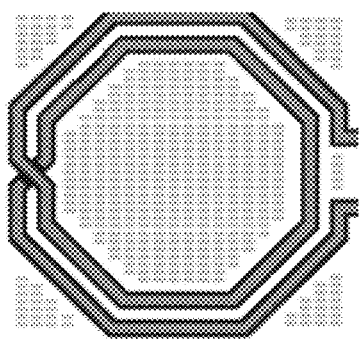
FIG. 7D illustrate the filled spiral inductor shown in FIG. 7B in an orientation different from the ones shown in FIGS. 7B and 7C.
Figure 7A:
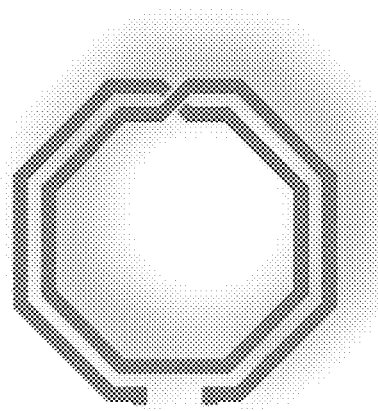
FIG. 7A illustrates an example of the spiral inductor.
Figure 7C:
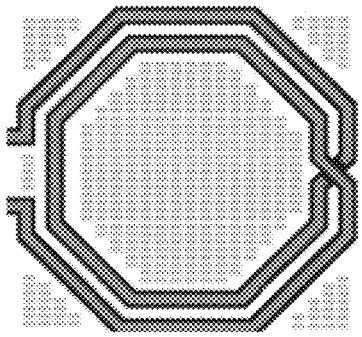
FIG. 7C illustrate the filled spiral inductor shown in FIG. 7B in an orientation different from the original one.

FIG. 6 illustrates an example of interactions between the size of dummy fills and the quality factor (Q-factor) of a spiral inductor. As the figure shows, the quality factor (Q-factor) changes significantly with the size of the dummy fills and the frequency characteristics of the Q-factor also behave quite differently for different sizes of the dummy fills. FIG. 7A illustrates an example of the spiral inductor and FIG. 7B illustrates an example of the spiral inductor being filled. FIGS. 7C and 7D illustrate examples of the filled spiral inductor in two orientations different from the original one. Convention fill flows may fill the spiral inductor in the different orientations shown in FIGS. 7B-D differently, resulting in different Q-factor values and/or different frequency characteristics of the Q-factor even if they are next to each other in the layout design.

Another example of the processing performed by the layout design processing unit 340 is layout design decomposition for multi-patterning. The layout design processing unit 340 will ensure the layout patterns identified by the pattern matching unit 330 to be decomposed in the same way (including keeping them in the same mask). This allows, for example, two matched transistors to have the same electrical characteristics.

In operation 460, the context-aware patent matching tool 300 reports the processing results. The reporting may comprise storing and/or displaying the processing results.

CONCLUSION

While the disclosed technology has been described with respect to specific examples including presently preferred modes of carrying out the disclosed technology, those skilled in the art will appreciate that there are numerous variations and permutations of the above described systems and techniques that fall within the spirit and scope of the disclosed technology as set forth in the appended claims. For example, while specific terminology has been employed above to refer to electronic design automation processes, it should be appreciated that various examples of the disclosed technology may be implemented using any desired combination of electronic design automation processes. Moreover, while dummy fill and multiple patterning are used as examples to illustrate how the disclosed technology can improve circuit design and manufacturing process, the disclosed technology can be employed by other aspects of a design/verification/manufacture flow.

What is claimed is:

1. One or more non-transitory computer-readable media storing computer-executable instructions, the computer-executable instructions, when executed, causing one or more processors to perform a method, the method comprising:
   receiving a circuit design, circuit components of the circuit design being associated with geometric elements of a layout design;
   analyzing the circuit design to identity circuit components of interest;
   extracting reference layout patterns from the layout design that are associated with the circuit components of interest, and storing the extracted reference layout patterns in a reference pattern library;
   performing pattern matching to identify layout patterns that match the reference layout patterns;
   processing the layout patterns; and
   reporting results of the processing.

2. The one or more non-transitory computer-readable media recited in claim 1, wherein the extracting comprises:
   determining preliminary reference layout patterns that are associated with the circuit components of interest; and
   compressing the preliminary reference layout patterns to generate reference layout patterns.

3. The one or more non-transitory computer-readable media recited in claim 1, wherein the processing comprises adding dummy fills to the layout patterns.

4. The one or more non-transitory computer-readable media recited in claim 3, wherein the dummy fills are added based on orientations of the layout patterns.

5. The one or more non-transitory computer-readable media recited in claim 1, wherein the processing comprises performing layout decomposition for multiple-patterning.

6. The one or more non-transitory computer-readable media recited in claim 1, wherein the pattern matching comprises fuzzy pattern matching.

7. A method, executed by at least one processor of a computer, comprising:
   receiving a circuit design, circuit components of the circuit design being associated with geometric elements of a layout design;
   analyzing the circuit design to identity circuit components of interest;
   extracting reference layout patterns from the layout design that are associated with the circuit components of interest, and storing the extracted reference layout patterns in a reference pattern library;
   performing pattern matching to identify layout patterns that match the reference layout patterns;
   processing the layout patterns; and
   reporting results of the processing.

8. The method recited in claim 7, wherein the extracting comprises:
   determining preliminary reference layout patterns that are associated with the circuit components of interest; and
   compressing the preliminary reference layout patterns to generate reference layout patterns.

9. The method recited in claim 7, wherein the processing comprises adding dummy fills to the layout patterns.

10. The method recited in claim 9, wherein the dummy fills are added based on orientations of the layout patterns.

11. The method recited in claim 7, wherein the processing comprises performing layout decomposition for multiple-patterning.

12. The method recited in claim 7, wherein the pattern matching comprises fuzzy pattern matching.

13. A system comprising:
   one or more processors, the one or more processors programmed to perform a method, the method comprising:
   receiving a circuit design, circuit components of the circuit design being associated with geometric elements of a layout design;
   analyzing the circuit design to identity circuit components of interest;
   extracting reference layout patterns from the layout design that are associated with the circuit components of interest, and storing the extracted reference layout patterns in a reference pattern library;
   performing pattern matching to identify layout patterns that match the reference layout patterns;
   processing the layout patterns; and
   reporting results of the processing.

14. The system recited in claim 13, wherein the extracting comprises:
   determining preliminary reference layout patterns that are associated with the circuit components of interest; and
   compressing the preliminary reference layout patterns to generate reference layout patterns.

15. The system recited in claim 13, wherein the processing comprises adding dummy fills to the layout patterns.

16. The system recited in claim 15, wherein the dummy fills are added based on orientations of the layout patterns.

17. The system recited in claim 13, wherein the processing comprises performing layout decomposition for multiple-patterning.

18. The system recited in claim 13, wherein the pattern matching comprises fuzzy pattern matching.

* * * * *